United States Patent
Waag

(10) Patent No.: US 12,275,329 B2
(45) Date of Patent: Apr. 15, 2025

(54) MULTI-VOLTAGE STORAGE SYSTEM FOR AN AT LEAST PARTIALLY ELECTRICALLY DRIVEN VEHICLE

(71) Applicant: Bayerische Motoren Werke Aktiengesellschaft, Munich (DE)

(72) Inventor: Wladislaw Waag, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 221 days.

(21) Appl. No.: 17/768,015

(22) PCT Filed: Oct. 14, 2020

(86) PCT No.: PCT/EP2020/078814
§ 371 (c)(1),
(2) Date: Apr. 11, 2022

(87) PCT Pub. No.: WO2021/089281
PCT Pub. Date: May 14, 2021

(65) Prior Publication Data
US 2024/0092223 A1  Mar. 21, 2024

(30) Foreign Application Priority Data
Nov. 5, 2019  (DE) ...................... 10 2019 129 705.2

(51) Int. Cl.
*B60L 58/19*  (2019.01)
*B60L 53/10*  (2019.01)

(52) U.S. Cl.
CPC ............... *B60L 58/19* (2019.02); *B60L 53/11* (2019.02)

(58) Field of Classification Search
CPC .......... B60L 58/19; B60L 53/11; B60L 53/63; Y02E 60/00; Y02T 10/70; Y02T 10/7072; Y02T 90/12; Y02T 90/14; Y04S 10/126
(Continued)

(56) References Cited

U.S. PATENT DOCUMENTS

2018/0056798 A1  3/2018 Syouda
2019/0143822 A1  5/2019 Malek et al.
(Continued)

FOREIGN PATENT DOCUMENTS

CN  107785949 A  3/2018
CN  108206566 A  6/2018
(Continued)

OTHER PUBLICATIONS

Chinese-language Office Action issued in Chinese Application No. 202080063041.9 dated Jan. 18, 2024 with English translation (19 pages).
(Continued)

*Primary Examiner* — Paul Dinh
(74) *Attorney, Agent, or Firm* — Crowell & Moring LLP

(57) ABSTRACT

A multi-voltage storage system for an at least partially electrically driven vehicle comprising: a first high-voltage energy storage module and a second high-voltage energy storage module; one switching unit of identical design for each energy storage module, each switching unit having two positive inputs and two negative inputs, by means of which at least one load connection and one charging connection can be formed, a controllable contactor being provided downstream of each input, and the negative inputs each being able to be connected to a negative pole of an energy storage module and the positive inputs each being able to be connected to a positive pole of an energy storage module by means of the contactors; and a control unit, which is designed such that all the contactors of each switching unit can be controlled independently of each other in any way by the control unit.

10 Claims, 6 Drawing Sheets

(58) Field of Classification Search
USPC .......................................................... 320/109
See application file for complete search history.

(56) References Cited

U.S. PATENT DOCUMENTS

| | | | |
|---|---|---|---|
| 2019/0283611 A1 | 9/2019 | Conlon et al. | |
| 2023/0211686 A1* | 7/2023 | Smolenaers | B60L 53/11 320/109 |

FOREIGN PATENT DOCUMENTS

| | | | |
|---|---|---|---|
| CN | 108377010 A | 8/2018 | |
| CN | 109980713 A | 7/2019 | |
| CN | 110271451 A | 9/2019 | |
| DE | 10 2014 014 925 A1 | 4/2016 | |
| DE | 10 2014 014 926 A1 | 4/2016 | |
| DE | 10 2015 214 732 A1 | 2/2017 | |
| DE | 10 2017 010 998 A1 | 5/2018 | |
| DE | 10 2017 221 770 A1 | 6/2018 | |
| DE | 10 2017 218 067 A1 | 4/2019 | |
| DE | 10 2018 128 275 A1 | 5/2019 | |
| DE | 10 2019 105 890 A1 | 9/2019 | |

OTHER PUBLICATIONS

International Search Report (PCT/ISA/210) issued in PCT Application No. PCT/EP2020/078814 dated Jan. 21, 2021 with English translation (four (4) pages).

German-language Written Opinion (PCT/ISA/237) issued in PCT Application No. PCT/EP2020/078814 dated Jan. 21, 2021 (six (6) pages).

German-language Office Action issued in German Application No. 10 2019 129 705.2 dated Jul. 7, 2020 with English translation (14 pages).

Chinese-language Office Action issued in Chinese Application No. 202080063041.9 dated Jun. 1, 2023 with English translation (20 pages).

* cited by examiner

MULTI-VOLTAGE STORAGE SYSTEM FOR AN AT LEAST PARTIALLY ELECTRICALLY DRIVEN VEHICLE

FIELD

The invention relates to a multi-voltage storage system for an at least partially electrically driven vehicle. The invention relates in particular to a storage system that can be charged using relatively high charging powers.

BACKGROUND AND SUMMARY

In the case of partially electrically driven vehicles, for example in the case of PHEV vehicles (plug-in hybrid electric vehicles), or in the case of purely electrically operated vehicles, for example in the case of BEV vehicles (battery electric vehicles), an energy storage unit (high-voltage storage unit) composed of one or more individual high-voltage battery cells or storage cells is currently used as the energy source. The high-voltage battery cells are usually individual lithium-ion cells. These are connected to one another in series or in a combination of series and parallel connections. The total number of the high-voltage battery cells in this case determines the available energy and therefore the range of an electrically driven vehicle.

Such an energy storage unit is typically charged by connecting it to an external charging station that is connected to an energy supply grid. The available input power (charging power) for charging the energy storage unit may in this case be dependent on the charging station. Charging by means of DC current can be referred to as fast charging, with a charging power of 50 kW or more. Charging using AC current allows charging powers in the range from 3.6 kW to 22 kW.

High charging powers are advantageous in order to avoid long downtimes for a vehicle for recharging the energy storage unit. One option for increasing the charging power is DC charging at an increased charging voltage (of for example 800 V or more, instead of 460 V or less at present).

The use of a higher charging voltage requires changes to be made to the high-voltage storage technology that is used, however. In this case, the use of energy storage units having correspondingly increased rated voltages is usually undesirable (for example due to the insulated gate bipolar transistors that are used in the inverter of the drivetrain, which are able to be used only up to particular maximum limit voltages).

Reference is made, for example, to DE 10 2017 218 067 A1 as further technical background. This discloses, for example, the use of two energy storage units for a vehicle with a changeover matrix that is used to connect the energy storage units in parallel or in series, with the result that the voltage of an energy storage unit doubles in the case of a series interconnection. It is therefore possible to use an unchanged driving voltage (for example of 400 V) in a driving mode and an increased charging voltage (for example of 800 V) in a charging mode. DE 10 2017 218 067 A1 deals in particular with providing a switchable storage system that can be changed over between a charging mode and a driving mode in a reliable and energy-efficient manner.

Proceeding from the cited prior art, the present invention is based on the technical object of maximizing the range of an at least partially electrically driven vehicle and simultaneously accelerating its availability.

This object is achieved by the independent claims. Advantageous embodiments are described inter alia in the dependent claims. It is pointed out that additional features of a patent claim that is dependent on an independent patent claim, without the features of the independent patent claim or only in combination with a subset of the features of the independent patent claim, can form a separate invention that is independent of the combination of all of the features of the independent patent claim and that can become the subject matter of an independent claim, a divisional application or a subsequent application. This applies in the same manner to technical teaching described in the description, which can form an invention that is independent of the features of the independent patent claims.

The invention is in principle a particularly flexible and cost-effective changeover matrix (e.g. 800 V/400 V) for high-voltage energy storage units (also called high-voltage storage units or high-voltage batteries for short).

The invention is based on the following observations:

The objective was to find an optimum solution for high-voltage energy storage units that in particular are used for driving in a 400 V system and can also be used for 800 V and 400 V DC fast charging.

The passenger electric vehicles currently available on the market usually have a 400 V high-voltage battery system, which means that the voltage of the high-voltage battery is up to approximately 470-490 V. Some automobile manufacturers have future plans to increase the voltage to approximately 800 V. The higher voltage allows, amongst other things, the charging power during fast charging (what is known as DC charging at a DC charging column) to be increased and therefore the charging time to be reduced. Reference is made to a 400 V or 800 V system below, and this means that the maximum voltage, which actually varies during operation, depending on the state of charge of the high-voltage battery, is in the order of magnitude of 400 V or 800 V.

The new standards for charging columns prescribe that these charging voltages must support up to 1000 V. There are, however, already many charging columns in the field that handle only voltages of up to 400 V-500 V. The aim is therefore for a top-of-the-range vehicle to have to support both 800 V charging and 400 V charging.

This results in different options for which voltages are used in which states:
  400 V for driving and 400 V or 800 V for DC charging
  800 V for driving and 800 V or 400 V for DC charging.
  This in turn results in two variants for how 400 V and 800 V are implemented in a vehicle:
  One voltage level (normally the one that is used for driving) is used as the standard voltage level. A DC-DC converter is additionally implemented so as to allow the other voltage level to be used for charging. The disadvantage is that the DC-DC converter is very cost-intensive.
  The high-voltage battery is divided into two parts or two high-voltage energy storage units are used. The two options are collectively described as two energy storage modules below. These energy storage modules are connected either in parallel (for 400 V voltage) or in series (for 800 V voltage). However, this requires a changeover matrix to be developed.

Technical Problem

The objective of the invention is to provide a high-voltage storage unit modular system that can be used as a changeover matrix both in a pure 400 V system and in a 400 V/800 V system. Most electric vehicles can be constructed as a pure 400 V system in a cost-effective manner. The high-power vehicles can be constructed as systems which can be changed over between 400 V and 800 V with minimal additional development outlay by using, according to the invention, appropriately interconnectable identical parts (modular system).

In principle, each high-voltage storage unit or each energy storage module should have what is known as a switching unit (also referred to as switch box, s-box, contactor box, battery junction unit, battery disconnect unit, etc., for example). Amongst other things, the switching unit typically contains two contactors (main contactors), so as to isolate the high-voltage storage unit from the high-voltage vehicle electrical system, and two DC charging contactors that can connect the high-voltage storage unit to the DC charging socket in the vehicle. During DC charging, the plug of the DC charging column is plugged into the DC charging socket.

Basic Principle of the Invention (Core Concept)

The basic concept is the type of interconnection between two switching units that on their own are each used as a switching unit in a 400 V system and that together are used as a changeover matrix in a 400 V/800 V system (400 V driving and 400 V/800 V charging) that can be changed over. Merely by way of example, the voltage specification of 400 V is referred to here as the comparatively low rated voltage of two energy storage modules that is preferably used and currently needed for loads (in particular for the electric drive and for auxiliary loads). It is also called the load connection rated voltage below, in a generalized way. Merely by way of example, the voltage specification of 800 V is referred to here as the comparatively high rated voltage of two energy storage modules connected in series that is preferably used and currently possible for fast charging. It is also called the increased charging connection rated voltage below, in a generalized way, and in particular is double the load connection rated voltage.

The invention proceeds from a first string, consisting of a first energy storage module with a load connection rated voltage and with a first switching unit (s-box) assigned thereto, and from a second string, consisting of a second energy storage module with a load connection rated voltage and with a second switching unit (s-box) assigned thereto. The two strings are of the same design in this case. The switching units with a plurality of controllable contactors can be actuated differently by an electronic control unit, however.

Each switching unit has two positive inputs and two negative inputs, by way of which a load connection and a charging connection are formed. A switch or contactor that can be controlled by the electronic control unit is provided downstream of each input, by way of which switches or contactors the negative inputs can each be connected to a negative pole of an energy storage module, and by way of which switches or contactors the positive inputs can each be connected to a positive pole of an energy storage module. When all switches are open, both the load supply and charging are deactivated.

If two strings in a vehicle are provided with fast charging capability, the positive input of the load connection of the first string has to be permanently connected to the positive input of the load connection of the second string. Likewise, the negative input of the load connection of the first string has to be permanently connected to the negative input of the load connection of the second string. Furthermore, the negative input of the charging connection of the first string has to be permanently connected to the positive input of the charging connection of the second string. All of these connections occur upstream of the controllable contactors.

The control unit is in particular configured by means of an appropriately programmed functional module (computer program product) in such a way that either DC charging at the load connection rated voltage (for example 400 V) or DC charging at the increased charging connection rated voltage (for example 800 V or double the load connection rated voltage) is made possible by way of the switching status of the contactors (open/closed).

In this case, at the same time, the load connection can also be supplied with power by the first or second energy storage module by closing the main contactors at least in the first or in the second string in order to supply loads (electric drive and/or auxiliary loads) connected thereto with power during charging.

This configuration according to the invention is based on the following insight:

When changing over from two 400 V energy storage modules to an 800 V high-voltage battery pack, in the prior art the auxiliary loads (such as the air-conditioning compressor or the passenger compartment heating system, for example) usually remain connected only to one 400 V energy storage module, since all vehicle electrical system components operate at 400 V. In the series interconnection of the two 400 V energy storage modules, this leads to a situation, at the end of the fast charging process, whereby the one 400 V energy storage module that supplies the auxiliary loads with power has a lower state of charge in comparison with the other 400 V energy storage module. Prior to the two series-connected 400 V energy storage modules being connected in parallel, the states of charge have to be equalized. In an internal procedure tested previously, an active energy loss was typically incorporated at the energy storage module with the higher state of charge for this purpose until an almost identical state of charge or an almost identical rated voltage was achieved. Only then was a parallel connection for subsequent vehicle operation able to be made.

One advantageous development of the invention is therefore also to prevent activation of energy losses when a state of charge difference needs to be equalized. According to the invention, this is accomplished, prior to the fast charging process and/or during the fast charging process, by virtue of the energy requirement of the auxiliary loads being met either by one energy storage module or by the other energy storage module for the purpose of equalizing a state of charge difference.

The invention proceeds from a first string and a second string, as described above, wherein the switching units with the controllable contactors are actuated by the electronic control unit in such a way that it is possible to activate and also change over the power supply for the auxiliary loads using the energy storage module desired in each case. According to the invention, the auxiliary loads are connected to the load connections for the e-drive for this purpose.

At the end of the fast charging, the two energy storage modules consequently have approximately the same state of charge and can be connected in parallel directly.

The invention therefore reduces the charging time and increases the state of charge at the end of the fast charging, since it is no longer necessary to perform discharging following the fast charging. The driver therefore has more range available following the fast charging, and additionally a shorter charging time.

According to the invention, a description is therefore given of a storage system and a method for operating an at least partially electrically operated vehicle having more than one energy storage unit, in particular having two electrical energy storage units.

The invention can preferably comprise a power forecast for an upcoming time interval within a normal fast charging process (for example for a time interval of 10, 15, 20 minutes or longer). In this case, it is possible to predict how each energy storage unit is at least partially discharged by loads unilaterally or simultaneously during the fast charging in the upcoming time interval. Furthermore, the invention can comprise ascertaining a voltage difference that is to be expected between the two energy storage units at the end of fast charging.

The storage system according to the invention comprises a first and a second energy storage module for storing electrical energy. In general, the storage system can comprise N energy storage modules for storing electrical energy, where N>1. Each energy storage module can in this case comprise at least one string of typically multiple storage cells. The number N of energy storage modules is an integer and preferably an even number, where N>1. It may preferably be the case that N=2, which gives an advantageous compromise between the charging voltage (for charging the storage system) and the driving voltage (for operating the drive system of the vehicle) (in particular with respect to the power transistors installed in the vehicle). The N energy storage modules can be of identical configuration (in particular with respect to the respective rated voltage and/or with respect to the respective storage capacity). The charging voltage can for instance be between 600 V and 1000 V. The driving voltage or the rated voltage of the energy storage modules can for instance be between 300 V and 500 V.

The storage system furthermore comprises a switching unit having a plurality of controllable switches that is designed to connect the N energy storage modules in series for a charging mode and to connect the N energy storage modules in parallel for driving the vehicle, that is to say to supply the drive system of the vehicle with power. The switching unit can furthermore be designed to couple or decouple each of the N energy storage modules to the drive system of the vehicle or from the drive system of the vehicle individually and/or to couple or decouple each of the N energy storage modules to or from a charging station individually and/or to isolate the N energy storage modules from one another in order to operate each of them with different vehicle electrical system loads individually.

The storage system furthermore comprises an electronic control unit that is designed to control the switching unit in accordance with its switching functions mentioned above. The control unit can be designed to actuate the switching unit in such a way that, for a charging process, the series connection consisting of the N energy storage modules is connected in parallel with a charging socket of the vehicle, by way of which the storage system can be connected to an external charging station.

The control unit is furthermore designed to initiate at least one measure to determine in advance a difference between a state of charge (SOC) and/or a voltage of the first energy storage module and a state of charge and/or a voltage of the second energy storage module in preparation for the first energy storage module and the second energy storage module being connected in parallel and to reduce or at least almost equalize this difference until the end of the fast charging.

Reducing the difference between the states of charge or the voltages between the N energy storage modules makes it possible to achieve a safe changeover from a series connection (for charging the energy storage modules) to a parallel connection (for driving the vehicle).

The control unit is furthermore designed so as, in the event of a predicted state of charge or voltage difference at the end of fast charging, to actuate the switching unit beforehand in preparation for the fast charging and/or during the fast charging in such a way that auxiliary loads are supplied with power from the energy storage module with the respectively higher state of charge, so that the state of charge difference is approximately equalized at the end of the charging. Furthermore, the power supply for the auxiliary loads during the fast charging could be changed over from one energy storage module to the other energy storage module (even repeatedly).

Details of the invention are explained with reference to an exemplary embodiment, in which N is chosen to be equal to 2 for the purpose of simplification.

DETAILED DESCRIPTION OF THE DRAWINGS

Figure 1:
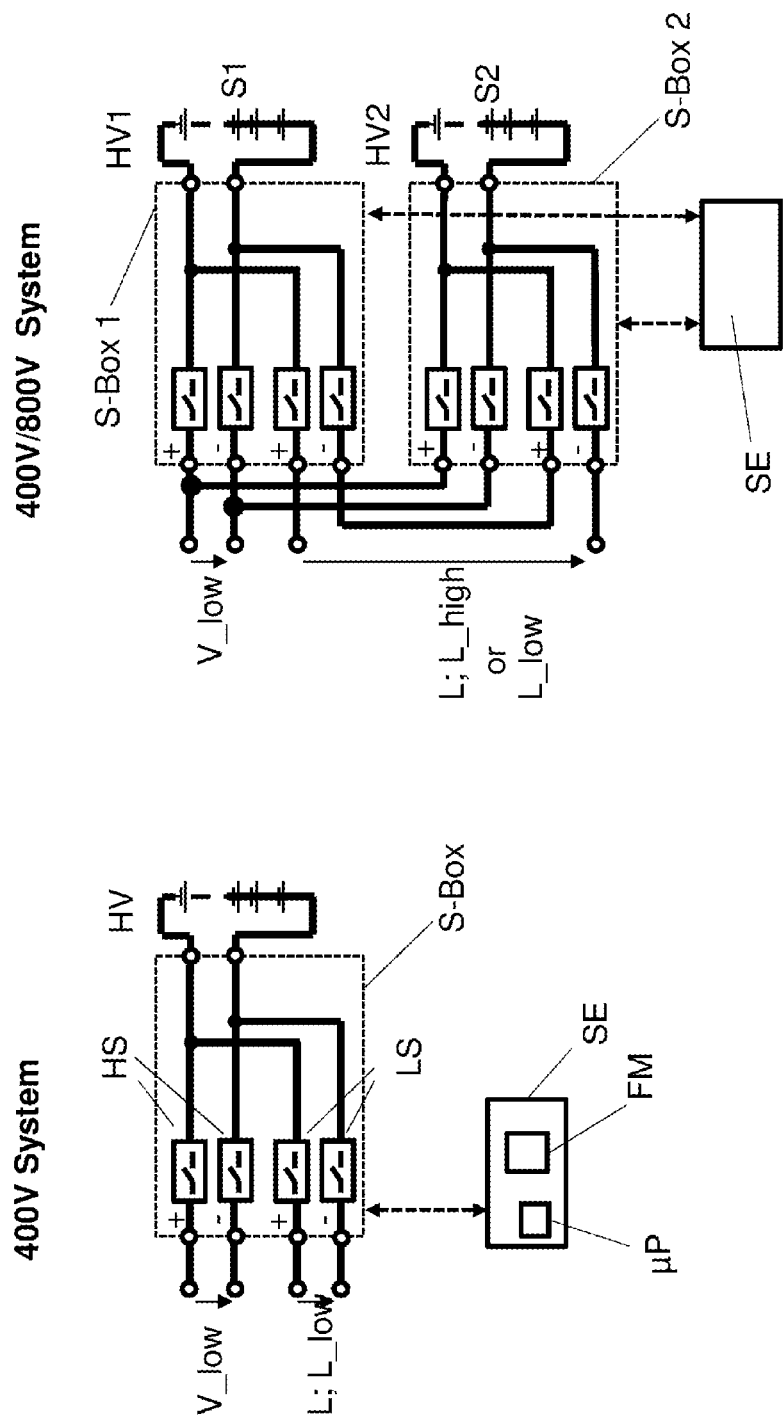
FIG. 1 is a schematic showing the principle of the basic concept according to the invention of a type of interconnection between two switching units that on their own are each used as a switching unit (s-box) in a 400 V system and together are used as a changeover matrix in a 400 V/800 V system (400 V driving and 400 V/800 V charging) that can be changed over.

The left-hand side of FIG. 1 shows a 400 V system without fast charging capability. The right-hand side depicts a 400 V/800 V system with fast charging capability.

The right-hand side of FIG. 1 shows a basic diagram of an interconnection of two strings S1 and S2. A first string S1, consists of a first energy storage module HV1 with a load connection rated voltage of 400 V in this case and with a first switching unit S-Box 1 assigned thereto, and a second string S2, consists of a second energy storage module HV2 with a load connection rated voltage likewise of 400 V in this case and with a second switching unit S-Box 2 assigned thereto. In this case, the two strings S1 and S2 are of the same design. The switching units S-Box 1 and S-Box 2 with a plurality of controllable contactors can be actuated differently by an electronic control unit SE however. The contactors are the following: main contactors HS and DC charging contactors LS (see the left-hand side of FIG. 1).

Figure 2:
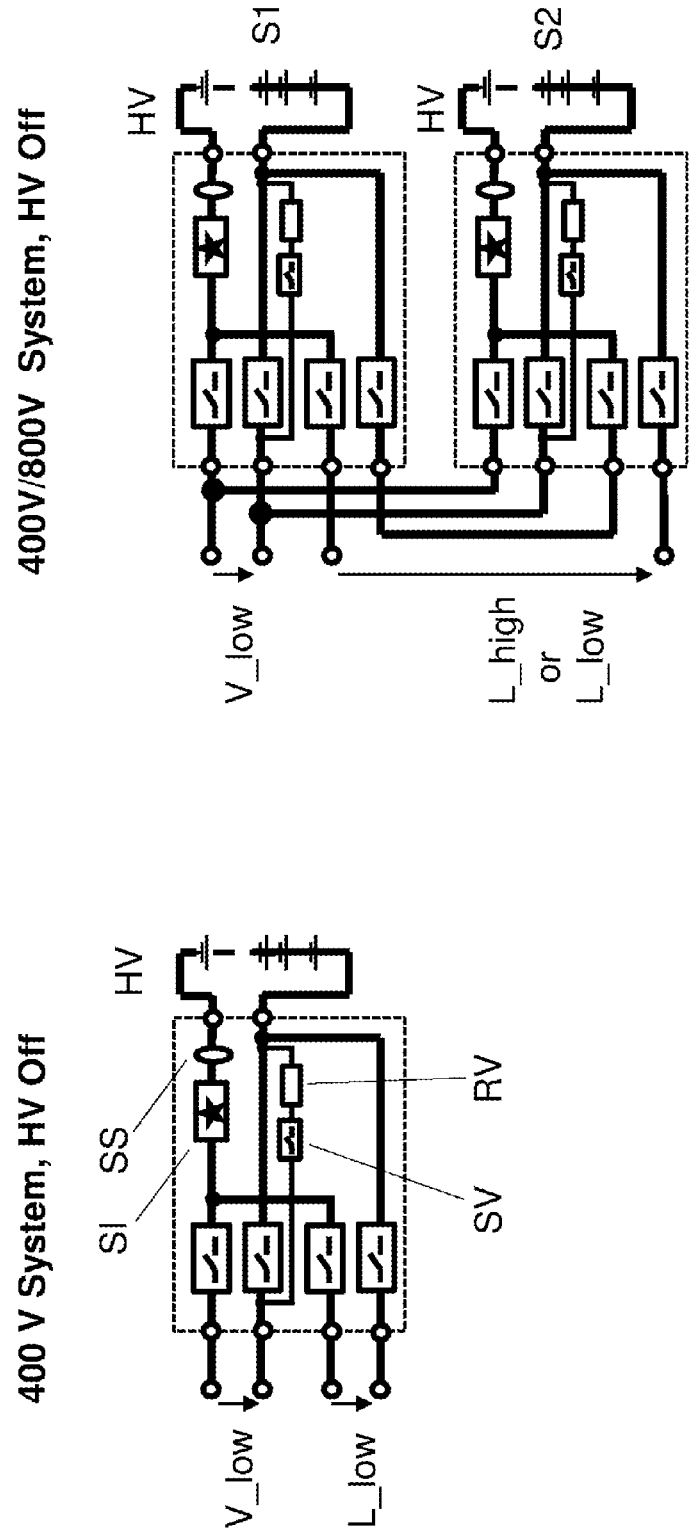
FIG. 2 is a schematic showing the implementation of a switching unit (s-box) typically having additional circuit elements, wherein in the switched off-state (HV Off), all contactors are open and there is no voltage present at the output of the high-voltage storage unit.

Each switching unit S-Box or S-Box 1 and S-Box 2 has two positive inputs (+) and two negative inputs (−), by way of which a load connection V_low and a charging connection L (L_high, for example, for charging at 400 V or L_low, for example, for charging at 800 V) are formed. A switch or contactor HS and LS that can be controlled by the electronic control unit SE is provided downstream of each input, by way of which switches or contactors the negative inputs (−) can each be connected to a negative pole of an energy storage module, and by way of which switches or contactors the positive inputs (+) can each be connected to a positive pole of an energy storage module. When all switches or contactors HS and LS are open, both the load supply and charging are deactivated (FIG. 1 and FIG. 2).

The load connection rated voltage (400 V) is present at the load connection V_low. The charging connection rated voltage can either correspond to the load connection rated voltage (400 V) at L_low or to double the load connection rated voltage (800 V) at L_high.

If two strings S1 and S2 in a vehicle are provided with fast charging capability, the positive input (+) of the load connection V_low of the first string S1 needs to be permanently connected to the positive input (+) of the load connection V_low of the second string S2. Likewise, the negative input (−) of the load connection V_low of the first string S1 needs to be permanently connected to the negative input (−) of the load connection V_low of the second string S2. Furthermore, the negative input (−) of the charging connection L (L_high or L_low) of the first string S1 needs to be permanently connected to the positive input (+) of the charging connection L (L_high or L_low) of the second string S2. All of these connections are made upstream of the controllable contactors HS and LS.

The control unit SE is in particular configured by means of an appropriately programmed functional module FM (computer program product) and by means of a computing processor μP in such a way that it can control the switching status of the contactors (open/closed) in an arbitrary manner. Said contactors are for example actuated in such a way that either DC charging at the load connection rated voltage (for example 400 V) or DC charging at the charging connection rated voltage (for example 800 V or double the load connection rated voltage) is made possible.

Figure 4A:
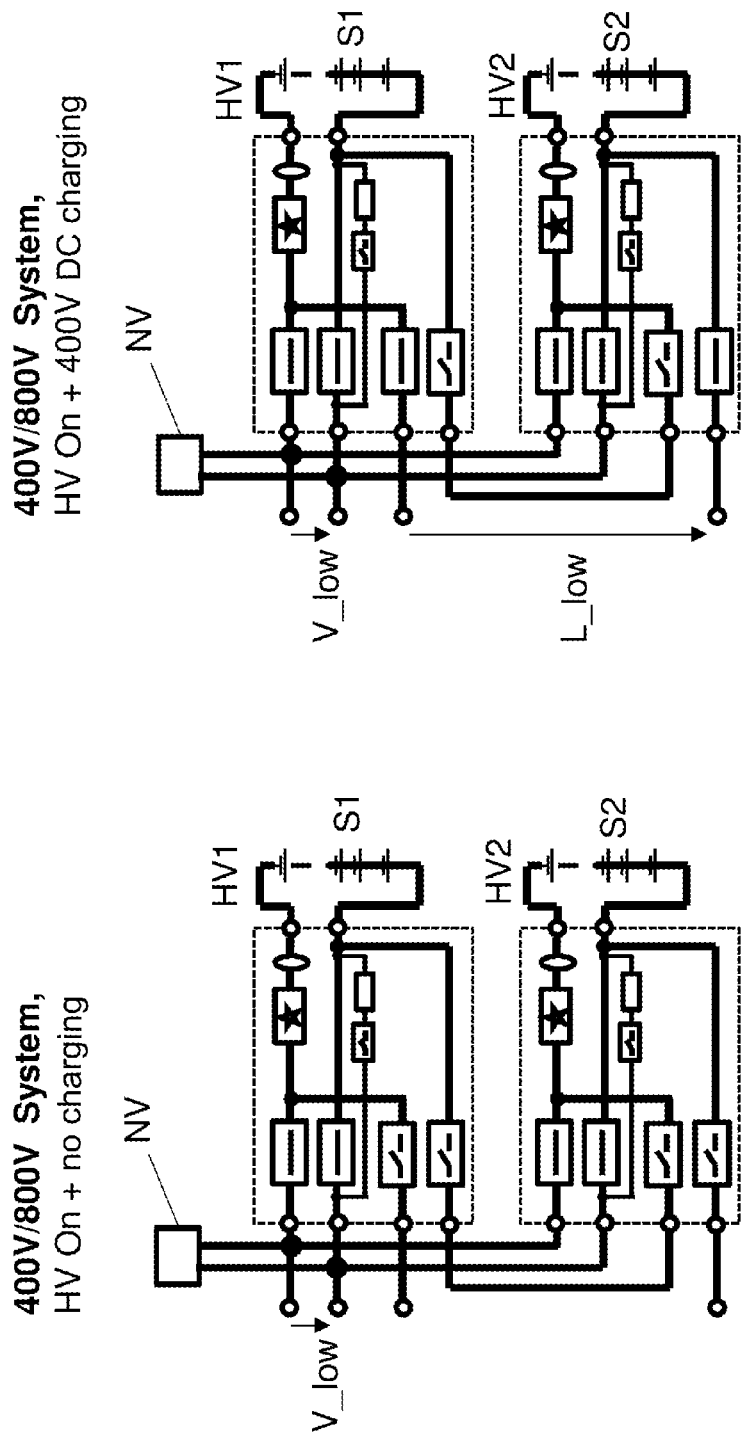
FIG. 4a is a schematic showing a parallel connection of string 1 and string 2 for the states HV On (driving mode or load supply, on the left-hand side in the diagram) and HV On with 400 V DC charging (on the right-hand side in the diagram) by way of appropriate connection of the contactors.
Figure 4B:
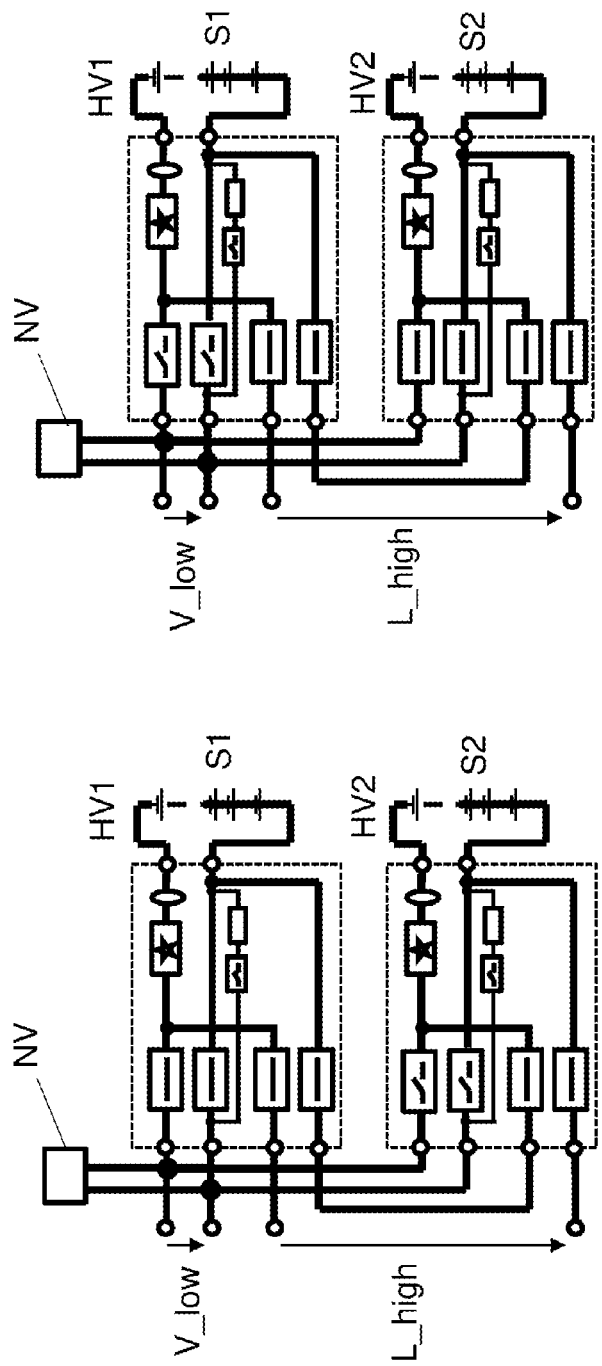
FIG. 4b is a schematic showing the interconnection in the two switching units (string 1 and string 2) during 800 V charging either with the power supply for the auxiliary loads from string 1 (left-hand diagram) or with the power supply for the auxiliary loads from string 2 (right-hand diagram)

In this case, at the same time, the load connection V_low can also be supplied with power by the first or by the second energy storage module HV1 or HV2 by closing the main contactors HS at least in the first or in the second string S1 or S2 in order to supply loads NV connected thereto with power during charging (see FIG. 4b).

FIG. 2 substantially corresponds to FIG. 1, wherein, for realistic implementation, in addition to the controllable main contactors HS and DC charging contactors LS, an s-box can also comprise a precharging circuit that typically can consist of a precharging contactor SV and a precharging resistor RV, a fuse SI (for example thermal fuse or pyrotechnic deactivation element) and a current sensor SS (for example shunt-based or Hall-effect-based).

In the switched-off state "HV Off", all contactors HS and LS are open and there is no voltage present at the output of the high-voltage storage unit.

The components designated in FIG. 1 and FIG. 2 are also applicable in the same way to the other figures.

Figure 3:
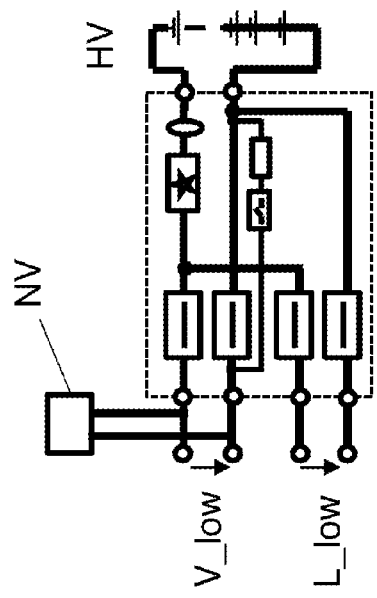
FIG. 3 is a schematic showing the interconnection in an s-box in which only the states HV On (driving mode or load supply, on the left-hand side in the diagram) and HV/DC On (load supply and DC charging, on the right-hand side in the diagram), for example, can be implemented by way of appropriate connection of the contactors.
Figure 3:
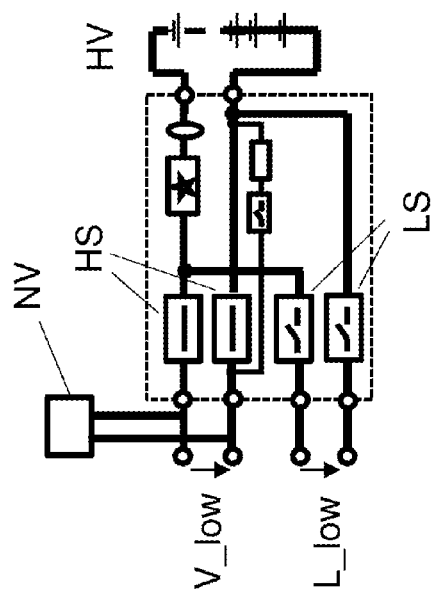

According to FIG. 3, by way of example, the states HV On (driving mode or power supply for the auxiliary loads NV) can be implemented by means of the single s-box in a 400 V system without fast charging capability, without charging by closing the contactors HS and opening the contactors LS (depicted on the left-hand side). The states HV On and DC On (DC charging and power supply for the auxiliary loads NV) can be implemented by closing all the contactors HS and LS.

In the state HV/DC ON, the main contactors HS are closed because auxiliary loads NV (cooler, heating system, 12 V DC-DC converter, etc.) are typically still connected in parallel with the e-drive at the e-drive connection V_low, some of which auxiliary loads also have to be active during DC charging. The e-drive connection is therefore generally referred to here as the load connection V_low.

According to FIGS. 4a and 4b, excluding HV Off, the following states can be implemented by means of the two switching units S-Box 1 and S-Box 2 (designations as in FIG. 1 and FIG. 2) in the form of a changeover matrix:
  HV On (=driving mode and/or auxiliary load supply) (string 1 and string 2 in parallel) (FIG. 4a, left-hand side)
  HV On+400 V DC charging (string 1 and string 2 in parallel) (FIG. 4a, right-hand side)
  HV On+800 V charging (string 1 and 2 in series), 400 V auxiliary load from string 1 (FIG. 4b, left-hand side)
  HV On+800 V charging (string 1 and 2 in series), 400 V auxiliary load from string 2 (FIG. 4b, right-hand side).

In this case, the power supply for the auxiliary loads NV continues to be guaranteed via the e-drive connection for 800 V DC charging and can be implemented from string 1 or string 2. In order that the two strings S1 and S2 are loaded equally, during a DC charging process, the power supply for the auxiliary loads NV from string 1 or string 2 can be changed over (even repeatedly) in each case. For example, the contactors HS and LS can be controlled by the control unit SE in such a way that the two strings S1 and S2 have the same voltage at the end of the charging time so that they can be connected in parallel following this.

Figure 5:
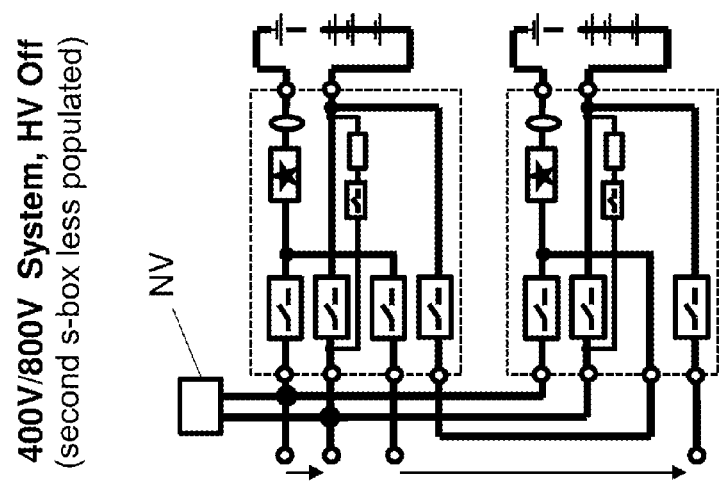
FIG. 5 is a schematic showing a switching unit with a reduced number of switches (or contactors).

Since two contactors in two strings S1 and S2 are always connected in series, according to FIG. 5, one of the two can be dispensed with so as to save on hardware costs. A less-populated version of the s-box can be produced for this, for example, with the result that a normal and a less-populated version are used in the system.

The control unit (SE) does not necessarily have to be separate: it can be integrated into each s-box. In a 400 V/800 V changeover system with two s-boxes, one of these can then adopt the "master" role (therefore additionally implement the superordinate changeover strategy) and the other the "slave" role.

What is claimed is:

1. A multi-voltage storage system for an at least partially electrically driven vehicle, comprising:
   a first high-voltage energy storage module and a second high-voltage energy storage module;
   a respective switching unit of the same design for each energy storage module, wherein each switching unit has two positive inputs and two negative inputs, by way of which at least one load connection and one charging connection are formed, wherein a controllable contactor is provided downstream of each input, and wherein the negative inputs can each be connected to a negative pole of an energy storage module, and the positive inputs can each be connected to a positive pole of an energy storage module, by way of the contactors; and a control unit that is configured in such a way that all the contactors of each switching unit can be actuated independently of one another in an arbitrary manner by way of said control unit.

2. The multi-voltage storage system according to claim 1, wherein, for fast charging by means of an increased charging connection rated voltage, the positive input of the load connection of the first switching unit is permanently connected to the positive input of the load connection of the second switching unit, the negative input of the load connection of the first switching unit is permanently connected to the negative input of the load connection of the second switching unit, and the negative input of the charging connection the first switching unit is permanently connected to the positive input of the charging connection of the second switching unit.

3. The multi-voltage storage system according to claim 1, wherein the control unit is configured in such a way that either charging at the comparatively low load connection rated voltage or fast charging at the increased charging connection rated voltage is made possible by way of the switching status of at least one charging contactor in the first switching unit and in the second switching unit.

4. The multi-voltage storage system according to claim 1, wherein charging at the comparatively low load connection rated voltage is made possible by closing at least one charging contactor at the positive input of one switching unit and by opening at least one charging contactor at the positive input of the other switching unit, and also by opening at least one charging contactor at the negative input of one switching unitand by closing at least one charging contactor at the negative input of the other switching unit.

5. The multi-voltage storage system according to claim 1, wherein fast charging at an increased charging connection rated voltage is made possible by closing all charging contactors of the two switching units.

6. The multi-voltage storage system according to claim 1, wherein the control unit is configured in such a way that, by closing main contactors at least in the first switching unit or in the second switching unit, the common load connection of the two switching units is supplied with power by the first or second energy storage module, and that both the electric drive and the auxiliary load are connected to this common load connection.

7. An electric vehicle having the multi-voltage storage system according to claim 1.

8. A method for operating a multi-voltage storage system comprising:

utilizing a single switching unit according to claim 1 in an electric vehicle without fast charging capability.

9. A method for operating a multi-voltage storage system for an at least partially electrically driven vehicle, having a first high-voltage energy storage module and having a second high-voltage energy storage module, wherein a respective switching unit of the same design is interconnected with each energy storage module, wherein each switching unit has two positive inputs and two negative inputs, and wherein a controllable contactor is provided downstream of each input, the method comprising:

actuating all the contactors of each switching unit independently of one another with a control unit in such a way that either charging at a comparatively low load connection rated voltage or fast charging at an increased charging connection rated voltage is made possible by way of the switching status of charging contactors in the first switching unit and in the second switching unit.

10. The method according to claim 9, further comprising:

closing main contactors at least in the first switching unit or in the second switching unit such that a common load connection of the two switching units is supplied with power by the first or second energy storage module, and such that both an electric drive and an auxiliary load are connected to the common load connection.

* * * * *